(12) United States Patent
Wolf-Monheim

(10) Patent No.: US 9,840,280 B2
(45) Date of Patent: Dec. 12, 2017

(54) MOTOR VEHICLE SUBFRAME

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/236,777

(22) Filed: Aug. 15, 2016

(65) Prior Publication Data
US 2017/0050674 A1    Feb. 23, 2017

(30) Foreign Application Priority Data

Aug. 20, 2015 (DE) ................... 10 2015 215 920

(51) Int. Cl.
*B62D 21/11* (2006.01)
*B60G 21/055* (2006.01)

(52) U.S. Cl.
CPC .......... *B62D 21/11* (2013.01); *B60G 21/0551* (2013.01); *B60G 2204/1222* (2013.01)

(58) Field of Classification Search
CPC .................... B62D 21/11; B60G 21/0551
See application file for complete search history.

(56) References Cited

U.S. PATENT DOCUMENTS

| | | | |
|---|---|---|---|
| 4,750,757 A * | 6/1988 | Long ................. | B60G 11/60 248/74.2 |
| 4,811,970 A | 3/1989 | Cassese | |
| 6,511,096 B1 | 1/2003 | Kunert et al. | |
| 6,523,841 B2 * | 2/2003 | Glaser ............... | B60B 35/006 280/124.106 |
| 6,708,994 B2 * | 3/2004 | Etzold ............... | B60G 7/001 280/124.106 |
| 7,566,063 B2 * | 7/2009 | Oki .................. | B60G 11/183 280/124.106 |
| 9,156,501 B2 | 10/2015 | Milner et al. | |
| 9,180,749 B2 * | 11/2015 | Baumer ............. | B60G 11/189 |
| 2013/0093156 A1 * | 4/2013 | Buschjohann ...... | B60G 21/051 280/124.128 |
| 2016/0194029 A1 * | 7/2016 | Kramer ............. | B60G 21/0555 280/124.109 |

FOREIGN PATENT DOCUMENTS

| | | |
|---|---|---|
| CN | 1944156 | 4/2007 |
| CN | 101778754 | 7/2010 |

(Continued)

*Primary Examiner* — Darlene P Condra
(74) *Attorney, Agent, or Firm* — Burgess Law Office, PLLC; Raymond L. Coppiellie

(57) ABSTRACT

A vehicle subframe for supporting wheel suspension elements and for mounting a stabilizer extending in a vehicle transverse direction. The subframe including two spaced longitudinal members extending in the vehicle longitudinal direction connected by at least one crossmember extending in the vehicle transverse direction. The crossmember having a hollow profile with a rear crossmember wall facing the stabilizer. The rear crossmember wall having an indentation extending in a longitudinal direction of the crossmember. The indentation faces the interior of the hollow profile wherein the stabilizer partially extends into the indentation.

12 Claims, 2 Drawing Sheets

(56) References Cited

FOREIGN PATENT DOCUMENTS

| DE | 4408573 A1 | 9/1994 |
|----|------------|--------|
| DE | 19805463 A1 | 8/1999 |
| DE | 102004054853 A1 | 5/2006 |
| DE | 102007052632 A1 | 5/2009 |
| DE | 102012022889 | 5/2014 |
| DE | 102013011562 | 1/2015 |
| JP | 2009029197 | 2/2009 |
| JP | 2011093344 | 5/2011 |

* cited by examiner

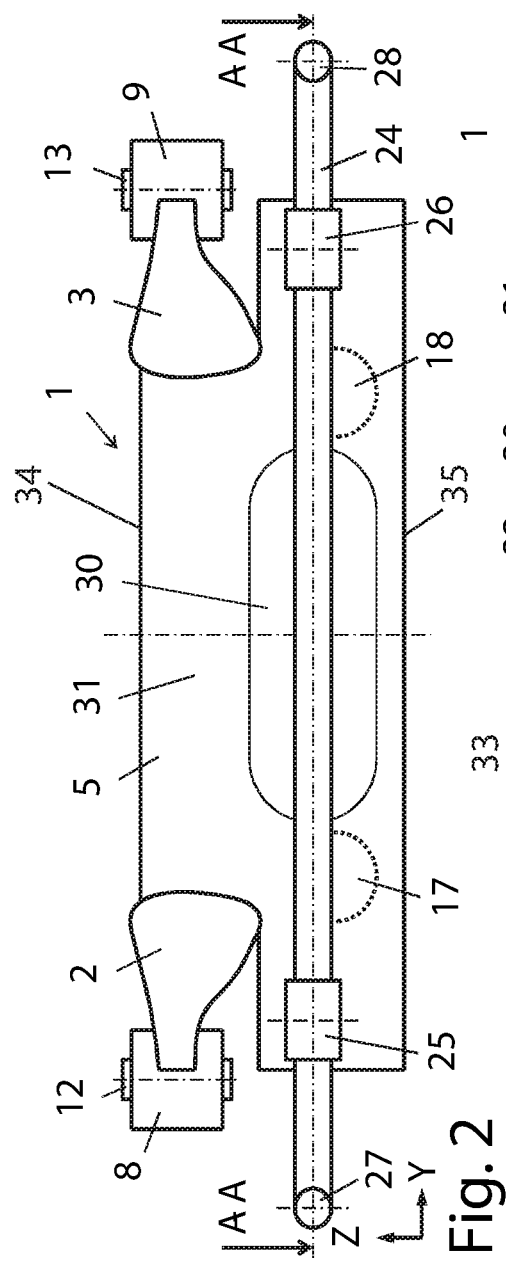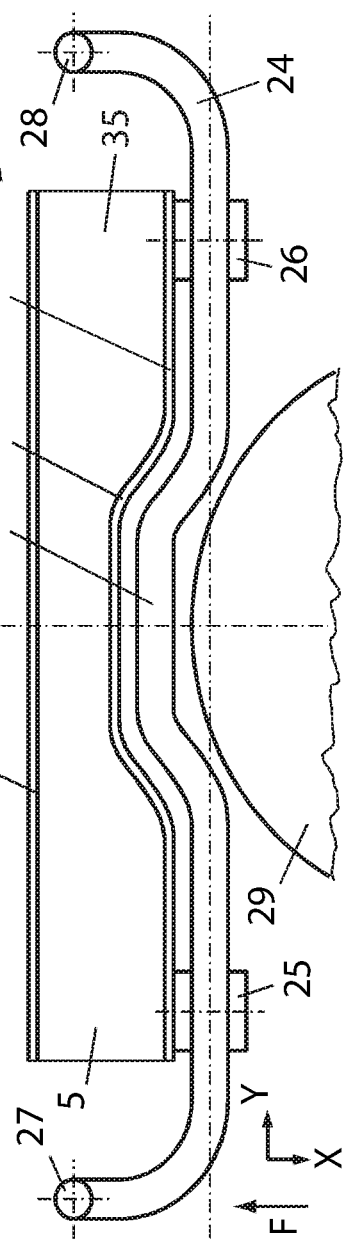

MOTOR VEHICLE SUBFRAME

CROSS-REFERENCE TO RELATED APPLICATIONS

Not Applicable.

BACKGROUND OF THE INVENTION

1. Field of the Invention

The invention relates to a motor vehicle; and more specifically, to a motor vehicle subframe.

2. Description of Related Art

Vehicle subframes are often formed from a frame construction including two parallel, spaced apart longitudinal members connected together in the manner of a frame by two parallel, spaced apart cross members. The subframe serves, for example, for attaching wheel-guiding control arms, wherein the control arms are connected on one side to the subframe and, on the other side, to a wheel carrier receiving the wheel. The subframe may also receive additional vehicle components, for example a transfer gearbox, intermediate gear, differential gear, or differential. The subframe may be connected as a whole to the vehicle structure, wherein the subframe is fastened by a plurality of bearings, preferably four bearings, to the vehicle structure.

A generally substantially U-shaped stabilizer bar, also known as a stabilizer, is installed in a vehicle and acts on the left-hand and right-hand wheel suspension of a motor vehicle axle, whereby greater lateral inclinations of the vehicle structure may be avoided during cornering.

In modern rear wheel suspensions of motor vehicles, space is often limited near the rear lower floor. A number of individual components, for example, of the wheel suspension and/or of the vehicle structure, need to be accommodated in a limited space.

Further, in a longitudinal direction of the vehicle, the arrangement in particular of a subframe of a rear wheel suspension including a stabilizer system and a spare wheel recess in the floor of the vehicle for receiving a full-size spare wheel may lead to a considerable problem.

SUMMARY OF THE INVENTION

A vehicle subframe having a plurality of spaced longitudinal members extending in a vehicle longitudinal direction with the longitudinal members connected by at least one crossmember extending in a vehicle transverse direction. The crossmember having a hollow profile including a front crossmember wall, a rear crossmember wall, a top crossmember wall, and a bottom crossmember wall with the top crossmember wall and bottom crossmember wall extending between the front crossmember wall and the rear crossmember wall.

The rear crossmember wall and front crossmember wall extending both transversely to the vehicle longitudinal direction and in the vehicle vertical direction wherein the rear crossmember wall is spaced longitudinally rearward of and behind the front crossmember wall. The rear crossmember wall including an indentation extending in a longitudinal direction of the crossmember, with the indentation extending in the vehicle longitudinal direction and into an interior of the hollow profile and towards the front crossmember wall between the top crossmember wall and the bottom crossmember wall.

A stabilizer extends in a vehicle transverse direction between a first and second stabilizer bearings and lies in a plane including a vehicle longitudinal direction with a portion of the stabilizer extending in the indentation in the crossmember.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a rear view of the subframe of FIG. 1.

FIG. 3 is a sectional view taken along the line A-A in FIG. 2.

DETAILED DESCRIPTION OF THE PREFERRED EMBODIMENTS

Figure 1:
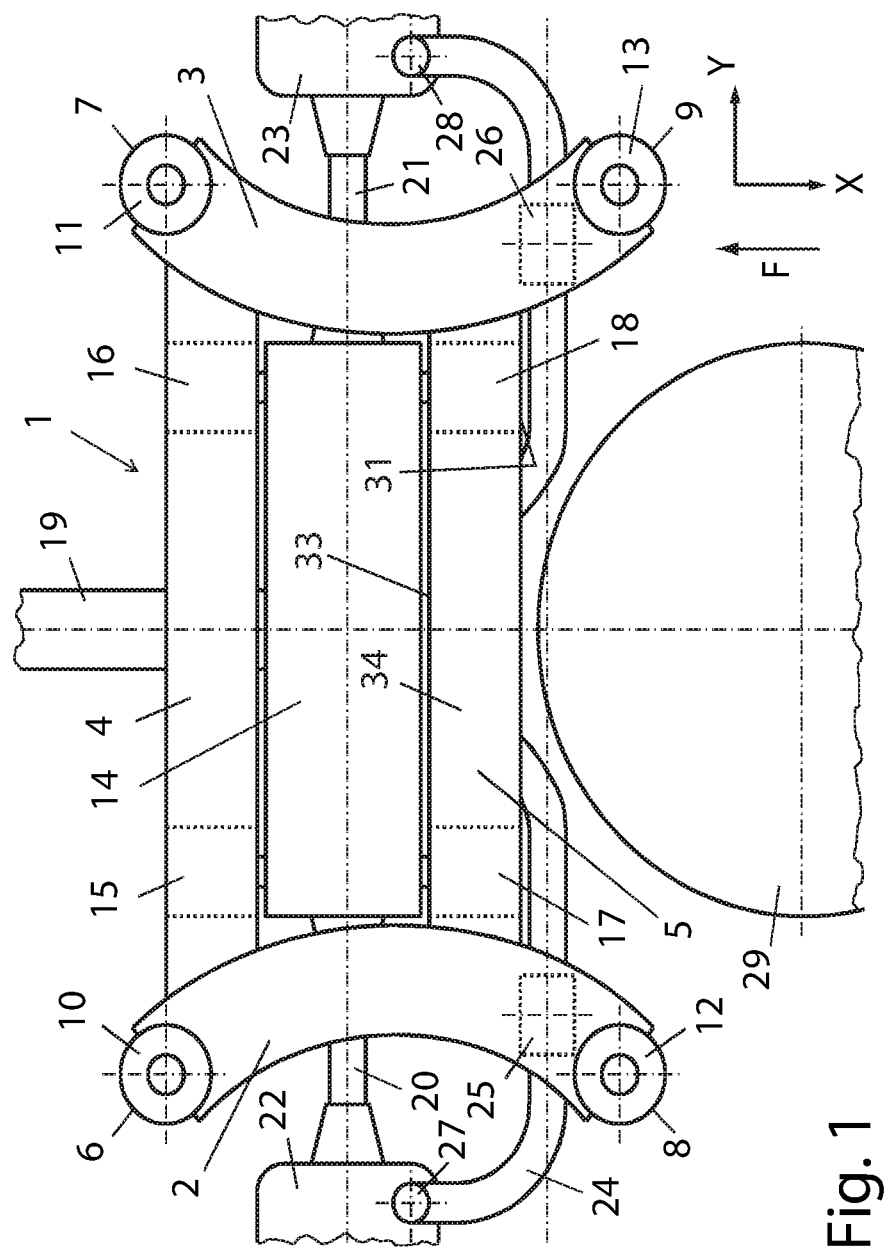
FIG. 1 is a plan view of an exemplary embodiment of a subframe according to the invention.

The following description of the preferred embodiment(s) is merely exemplary in nature and is in no way intended to limit the invention, its application, or uses.

The various figures use the same reference numerals for parts that are the same in terms of the function thereof so that generally these parts are described only once.

FIG. 1 shows schematically a plan view of an exemplary embodiment of a subframe 1 for a vehicle (not shown) according to the invention. The forward direction of travel of the vehicle is generally indicated in FIG. 1 by F, a vehicle longitudinal direction by X, a vehicle transverse direction by Y, and a vehicle vertical direction by Z, see FIG. 2.

FIG. 1 shows a subframe 1 including a left-hand longitudinal member 2 extending in the vehicle longitudinal direction X and a right-hand longitudinal member 3 extending in the vehicle longitudinal direction X and spaced apart from the longitudinal member 2. The longitudinal members 2, 3 may, for example, be produced by hydroforming sheet metal structures.

The subframe 1 also includes a front crossmember 4 extending in the vehicle transverse direction Y and a rear crossmember 5 extending in the vehicle transverse direction Y with the crossmembers connecting the longitudinal members 2 and 3 together. In the exemplary embodiment of the subframe 1 shown in FIG. 1, the crossmembers 4, 5 are produced as hollow profile parts from conventionally formed sheet metal structures. The crossmembers 4, 5 configured as hollow profile parts are formed in the exemplary embodiment of the subframe 1 shown in FIG. 1 with a closed cross section. Configuring the crossmember with a closed or closed in cross section provides optimal stability and stiffness of the crossmember. A material connection, for example welding, fixedly connects the longitudinal members 2, 3 to the crossmembers 4, 5.

To fasten the subframe 1 in a vibration-insulated manner to the vehicle structure (not shown), cylindrical metal sleeves 6, 7, 8 and 9 are connected to the respective ends of the longitudinal members 2, 3, for example by welding. Rubber bushings 10, 11, 12, and 13 pressed into the cylindrical metal sleeves 6, 7, 8, and 9 insulate the subframe 1 relative to the vehicle structure in terms of vibrations.

The subframe 1 shown in FIG. 1 is configured as a rear axle subframe and includes a rear drive unit 14, for example a differential, connected to the subframe 1 by bearing bushings 15, 16, 17, and 18 in a vibration-insulated manner. A drive shaft 19 connects a motor (not shown), which is arranged in the front portion of the vehicle with the gear unit (also not shown), to the rear drive unit 14. Axle shafts 20, 21 are arranged between the drive unit 14 and a left-hand wheel carrier 22 and/or a right-hand wheel carrier 23.

As shown in FIG. 1, a stabilizer bar 24 is rotatably mounted on the subframe 1 through stabilizer bearings 25, 26 in a vibration-insulated manner. The ends of the stabilizer 24 connect in each case to the left-hand and/or right-hand wheel carrier 22, 23 through connecting bearings 27, 28. Alternatively, the connecting bearings 27, 28 may connect the stabilizer 24 to other wheel suspension components, such as for example transverse control arms (not shown). In the exemplary embodiment shown in FIG. 1 of the subframe 1 the stabilizer is arranged to the rear of the crossmember 5 relative to the vehicle longitudinal direction X.

As seen in FIG. 1, the lower floor of the vehicle includes a spare wheel recess 29. The spare wheel recess located to the rear of the subframe 1 relative to the vehicle longitudinal direction X.

As shown in FIGS. 1-3 the rear crossmember 5 includes a rear crossmember wall 31, a front crossmember wall 33, a top crossmember wall 34, and a bottom crossmember wall 35. The top crossmember wall 34 and bottom crossmember wall 35 being substantially planar members extending in the vehicle longitudinal direction X. The front crossmember wall 33 and rear crossmember wall 31 being substantially planar members extending in the vehicle vertical direction Z. As shown, the crossmember wall portions 31, 33, 34, 35 join at their respective ends to form a substantially elongated tubular member having a hollow profile.

FIG. 2 shows a rear view of the subframe 1 of FIG. 1. This view shows an indentation 30 provided in the rear crossmember wall 31 of the rear crossmember 5, the indentation 30 extending in the crossmember longitudinal direction; i.e., in the vehicle transverse direction Y and facing toward the interior of the hollow profile of the crossmember 5. The stabilizer 24 partially extends into the indentation 30, see for example FIG. 1. In particular, the rear crossmember wall 31 of the crossmember 5 is configured such that the indentation 30 in the rear crossmember wall 31 of the crossmember 5 faces the stabilizer 24 with the crossmember being configured as a hollow profile. As shown in FIG. 2 the indentation 30 does not create an aperture or opening in the crossmember 5, instead it is an inward deflection of the material of the rear crossmember wall 31.

FIG. 3 shows a sectional view along the line A-A in FIG. 2 showing the indentation 30 in the rear crossmember wall 31 of the rear crossmember 5. Moreover, the stabilizer 24 in the exemplary embodiment shown in FIGS. 1-3 of the subframe 1 includes a protrusion 32 corresponding to the indentation 30, wherein the protruding portion or protrusion 32 of the stabilizer 24 extends into the indentation 30 of the rear crossmember 5. In particular, the protrusion 32 of the stabilizer 24 extends, without contact, into the indentation 30 of the crossmember 5 both under static and under dynamic conditions. Because the protrusion 32 corresponds to the indentation 30 of the crossmember wall 31 and extends into the indentation 30 of the crossmember wall 31 the protrusion 32 of the stabilizer 24 protrudes into the indentation 30 of the crossmember wall 31 in the region of the protrusion 32 of the stabilizer 24 and provides space for other components, for example the wheel suspension and/or vehicle structure such as the spare wheel recess 29. The indentation 30 of the crossmember wall 31 and the protrusion 32 of the stabilizer 24 are configured in terms of geometry such that during operation the stabilizer 24 may be resiliently deformed without contacting the crossmember wall 31.

FIGS. 2 and 3 show that the stabilizer bearings 25, 26 are attached outside the indentation 30 on the crossmember wall 31 of the rear crossmember 5 and are connected thereto.

FIG. 3 shows that the stabilizer 24 has a path on the subframe and/or on the crossmember, which is advantageous in terms of constructional space. In particular, the path of the stabilizer 24 on the subframe 1 permits the arrangement of the spare wheel recess 29 to the rear of the rear crossmember 5 for receiving a full-size spare wheel, without negatively influencing the dynamic behavior of the wheel suspension.

The subframe according to the invention described above is not limited to the embodiment disclosed herein. For example, it is conceivable that the indentation on the crossmember wall also extends over the entire longitudinal dimension thereof wherein the stabilizer could then extend along the entire crossmember in the vehicle transverse direction. In this case, the stabilizer bearings would preferably be connected to the crossmember inside the indentation of the crossmember wall.

According to a further embodiment of the invention, relative to a vehicle longitudinal direction the stabilizer is arranged to the rear of the crossmember provided with the indentation. Accordingly, the crossmember provided with the indentation is installed as a rear crossmember in a rear axle subframe forming a path of the stabilizer according to the invention on the crossmember. Doing so provides space for the arrangement, for example, of a spare wheel recess for receiving a full-size spare wheel. As disclosed, the invention provides a subframe for a motor vehicle, wherein the stabilizer is advantageously arranged in terms of constructional space.

For transmitting torsional moments through the stabilizer for compensating for the rolling movements of the vehicle structure, the stabilizer is preferably rotatably mounted in stabilizer bearings on the crossmember wall provided with the indentation. The stabilizer bearings may optionally be mounted inside the indentation on the crossmember wall. Alternatively, the stabilizer bearings may also be connected to the crossmember wall, outside the indentation of the corresponding crossmember wall.

In one embodiment, the stabilizer may be a one-piece, U-shaped stabilizer bar that extends continuously in the vehicle transverse direction between the two vehicle sides, and is indirectly or directly articulated on wheel-guiding elements of a wheel suspension.

In a preferred embodiment, the subframe according to the invention is used as a rear axle subframe in a motor vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle subframe for the articulation of wheel suspension elements and supporting a stabilizer extending in the vehicle transverse direction comprising;

a plurality of spaced longitudinal members extending in a vehicle longitudinal direction, said longitudinal members connected by at least one crossmember extending in the vehicle transverse direction;

said crossmember having a hollow profile including a front crossmember wall, a rear crossmember wall, top crossmember wall and a bottom crossmember wall, said top crossmember wall and said bottom crossmember wall extending between said front crossmember wall and said rear crossmember wall;

said rear crossmember wall and said front crossmember wall extending both transversely to the vehicle longitudinal direction and in the vehicle vertical direction wherein said rear crossmember wall is spaced longitudinally rearward of and behind said front crossmember wall;

said rear crossmember wall facing said stabilizer, said rear crossmember wall including an indentation extending in a longitudinal direction of the crossmember, said indentation extending in the vehicle longitudinal direction and into an interior of the hollow profile and towards said front crossmember wall between said top crossmember wall and said bottom crossmember wall; and said stabilizer at least partially extending in said indentation, wherein the crossmember is configured to be closed in cross section.

2. The subframe of claim 1 wherein the stabilizer is rotatably mounted in stabilizer bearings on the rear crossmember wall.

3. The subframe of claim 2 wherein the stabilizer bearings are connected to the rear crossmember wall outside of the indentation in said rear crossmember wall.

4. The subframe of claim 1 wherein said crossmember having said rear crossmember wall is installed as a rear crossmember in a rear axle subframe.

5. The subframe of claim 1 wherein said stabilizer includes an offset portion, said offset portion lying in a common plane with said stabilizer.

6. A vehicle subframe comprising;

a plurality of spaced longitudinal members extending in a vehicle longitudinal direction, said longitudinal members connected by at least one crossmember extending in the vehicle transverse direction;

said crossmember having a hollow profile including a front crossmember wall, a rear crossmember wall, a top crossmember wall, and a bottom crossmember wall, said top crossmember wall and said bottom crossmember wall extending between said front crossmember wall and said rear crossmember wall;

said rear crossmember wall and said front crossmember wall extending both transversely to the vehicle longitudinal direction and in the vehicle vertical direction wherein said rear crossmember wall is spaced longitudinally rearward of and behind said front crossmember wall;

said rear crossmember wall including an indentation extending in a longitudinal direction of the crossmember, said indentation extending in the vehicle longitudinal direction and into an interior of the hollow profile and towards said front crossmember wall between said top crossmember wall and said bottom crossmember wall; and a stabilizer, said stabilizer extending in a vehicle transverse direction between a first stabilizer bearing and a second stabilizer bearing and lying in a plane including a vehicle longitudinal direction, a portion of said stabilizer extending in said indentation.

7. The subframe of claim 6 wherein said rear crossmember wall faces said stabilizer.

8. The subframe of claim 6 wherein said stabilizer and said first and second stabilizer bearings lie in a common plane.

9. The subframe of claim 6 wherein said first and second stabilizer bearings are connected to the rear crossmember wall outside of the indentation in said rear crossmember wall.

10. The subframe of claim 6 wherein said stabilizer includes an offset portion, said offset portion lying in a common plane with said stabilizer.

11. The subframe of claim 6 wherein the stabilizer is rotatably mounted in said first and second stabilizer bearings on the rear crossmember wall.

12. The subframe of claim 6 wherein the first and second stabilizer bearings are connected to the rear crossmember wall outside of the indentation in said rear crossmember wall.

\* \* \* \* \*